(12) United States Patent
Kurashige (10) Patent No.: US 8,099,544 B2
(45) Date of Patent: Jan. 17, 2012

(54) INFORMATION PROCESSING APPARATUS AND NONVOLATILE SEMICONDUCTOR MEMORY DRIVE

(75) Inventor: Takehiko Kurashige, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 12/390,265

(22) Filed: Feb. 20, 2009

(65) Prior Publication Data

US 2009/0222688 A1 Sep. 3, 2009

Related U.S. Application Data

(63) Continuation of application No. PCT/JP2008/070717, filed on Nov. 7, 2008.

(30) Foreign Application Priority Data

Feb. 29, 2008 (JP) .................................. 2008-050807

(51) Int. Cl.
*G06F 12/00* (2006.01)
*G11C 16/02* (2006.01)

(52) U.S. Cl. .................................. 711/103; 365/185.33

(58) Field of Classification Search ......................... None
See application file for complete search history.

(56) References Cited

U.S. PATENT DOCUMENTS

| | | | |
|---|---|---|---|
| 6,388,921 B1 | 5/2002 | Yamamoto et al. | |
| 7,669,092 B2 * | 2/2010 | Murray | 714/710 |
| 7,783,845 B2 * | 8/2010 | Bennett et al. | 711/159 |
| 7,877,569 B2 * | 1/2011 | Honda | 711/202 |
| 2006/0227630 A1 | 10/2006 | Kato et al. | |

FOREIGN PATENT DOCUMENTS

| | | |
|---|---|---|
| JP | 07-057453 | 3/1995 |
| JP | 11-242889 | 9/1999 |
| JP | 2000-011677 | 1/2000 |
| JP | 2004-240660 | 8/2004 |
| JP | 2005-135544 | 5/2005 |
| JP | 2006-196135 | 7/2006 |
| WO | 2006/067853 A1 | 6/2006 |
| WO | 2008/016081 A1 | 2/2008 |

OTHER PUBLICATIONS

PCT Search Report in a corresponding Japanese application No. PCT/JP2008/070717 dated Jan. 6, 2009.

* cited by examiner

*Primary Examiner* — Gary Portka
(74) *Attorney, Agent, or Firm* — Blakely, Sokoloff, Taylor & Zafman LLP (57) ABSTRACT

According to one embodiment, a control module of a nonvolatile semiconductor memory drive has a first erase mode in which an address management table, which is indicative of a correspondency between logical block addresses and physical addresses of a nonvolatile semiconductor memory, is initialized to set the memory area of the nonvolatile semiconductor memory in a state in which no user data is written, a second erase mode in which the address management table is initialized to set the memory area in a state in which no user data is written, and the blocks, other than a defective block, which are included in the memory area, are erased, and a third erase mode in which the address management table is initialized to set the memory area in a state in which no user data is written, and the blocks, including the defective block, which are included in the memory area, are erased.

8 Claims, 7 Drawing Sheets

INFORMATION PROCESSING APPARATUS AND NONVOLATILE SEMICONDUCTOR MEMORY DRIVE

CROSS REFERENCE TO RELATED APPLICATIONS

This is a Continuation Application of PCT Application No. PCT/JP2008/070717, filed Nov. 7, 2008, which was published under PCT Article 21(2) in English.

This application is based upon and claims the benefit of priority from Japanese Patent Application No. 2008-050807, filed Feb. 29, 2008, the entire contents of which are incorporated herein by reference.

BACKGROUND

1. Field

One embodiment of the invention relates to an information processing apparatus and a nonvolatile semiconductor memory drive.

2. Description of the Related Art

In recent years, data storage devices, such as hard disks, have widely been used.

Jpn. Pat. Appln. KOKAI Publication No. 2006-196135 discloses a data storage device having a scramble/descramble function. This data storage device includes transmission/reception means, scrambler means, a hard disk, descrambler means, a memory, and initial value varying means. The transmission/reception means receives information from outside and transmits information in the data storage device to the outside. The scrambler means scrambles the information which the transmission/reception means receives from the outside. An output signal from the scrambler means is recorded on the hard disk. The descrambler means descrambles the signal that is read out of the hard disk. The memory outputs initial values to the scrambler means and the descrambler means. The initial value varying means varies the initial values when the data recorded on the hard disk is erased.

In this data storage device, if data erase of the hard disk is instructed via the transmission/reception means, the initial value varying means generates new initial values for the scrambler means and descrambler means. Data, which is newly recorded, is subjected to a scramble process and a descramble process on the basis of the new initial values.

On the other hand, the data, which has already been recorded on the hard disk before the variation of the initial values, is descrambled on the basis of initial values which are different from the initial values before the variation, and is then reproduced. Accordingly, since the data, which has already been recorded on the hard disk before the variation of the initial values, is descrambled on the basis of initial values which are entirely different from the initial values at the time of data recording, data with different values is read out.

Consequently, since the data, which is stored before the change of the initial values, cannot normally be read out, the change of initial values is virtual erase of the hard disk. Thus, the data can virtually be erased instantaneously, without erase data being overwritten on the hard disk of the data storage device. Thereby, the work time for re-use or discard of the hard disk can remarkably be reduced.

However, according to the conventional data storage device, although decoding of scrambled data is difficult, the take-out of the scrambled data can easily be performed. Thus, it is not possible to deny that the scrambled data may be decoded with the progress of decoding technologies. It is thus required to realize a novel function for surely executing erase of written information and preventing leak of information.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided an information processing apparatus comprising: an information processing apparatus main body; and a nonvolatile semiconductor memory drive which is accommodated in the information processing apparatus main body, the nonvolatile semiconductor memory drive including a nonvolatile semiconductor memory having a memory area including a plurality of blocks, and a control module, the control module having a first erase mode in which an address management table, which is indicative of a correspondency between logical block addresses and physical addresses of the nonvolatile semiconductor memory, is initialized to set the memory area in a state in which no user data is written, a second erase mode in which the address management table is initialized to set the memory area in a state in which no user data is written, and the blocks, other than a defective block, which are included in the memory area, are erased, and a third erase mode in which the address management table is initialized to set the memory area in a state in which no user data is written, and the blocks, including the defective block, which are included in the memory area, are erased, and the control module selectively using the first erase mode, the second erase mode and third erase mode, thereby executing an erase operation on the memory area.

This information processing apparatus can surely execute erase of written information and can prevent leak of information.

<Structure of Information Processing Apparatus>

Figure 1:
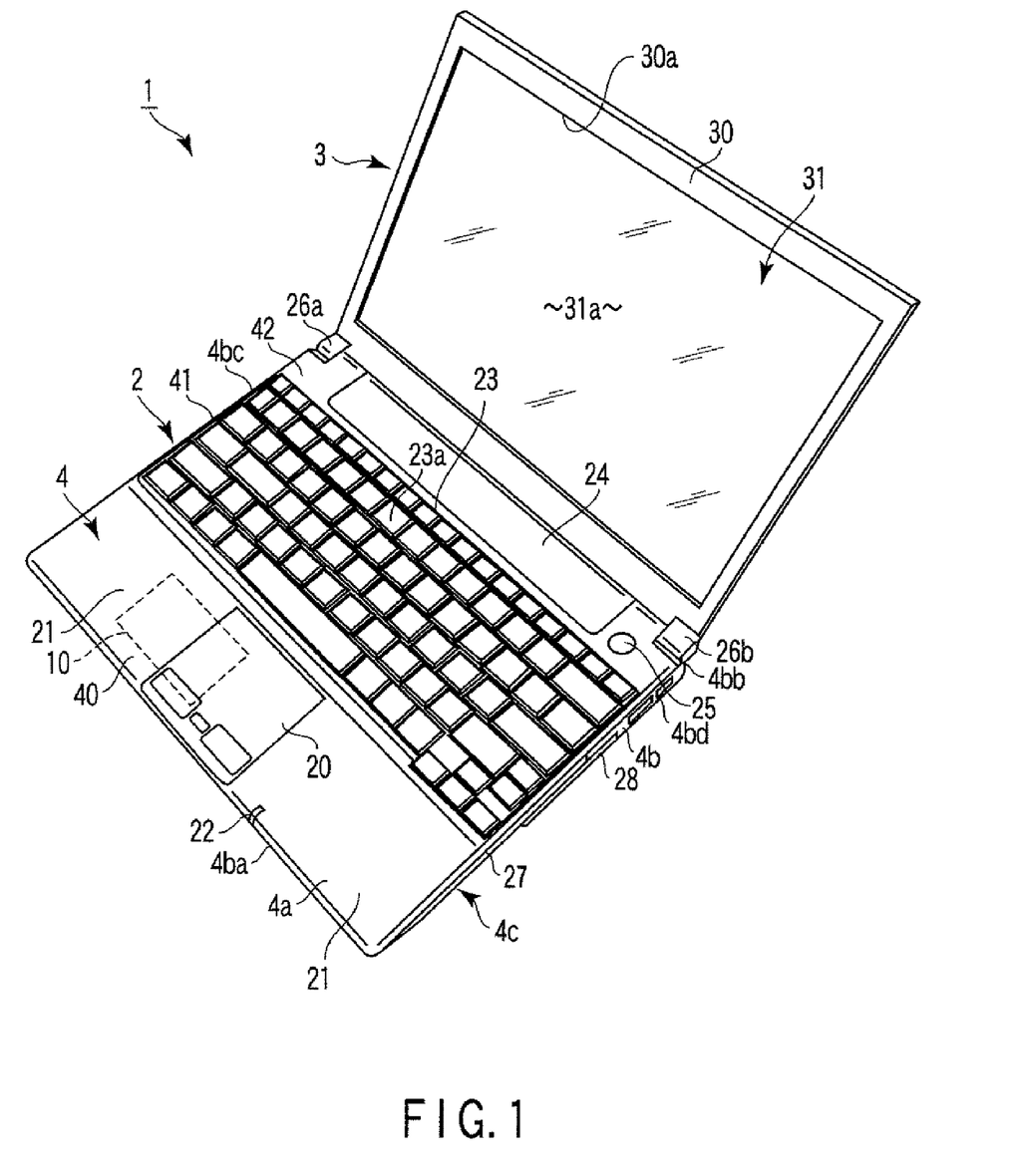
FIG. 1 is a perspective view showing the external appearance of an information processing apparatus according to an embodiment of the present invention.

FIG. 1 is a perspective view showing the external appearance of an information processing apparatus according to an embodiment of the present invention. This information processing apparatus 1, as shown in FIG. 1, is composed of a main body 2 and a display unit 3 which is attached to the main body 2.

The main body 2 has a box-shaped casing 4. The casing 4 includes an upper wall 4a, a peripheral wall 4b and a lower wall 4c. The upper wall 4a of the casing 4 includes a front part 40, a central part 41 and a back part 42 in the named order from the side close to a user who operates the information processing apparatus 1. The lower wall 4c is opposed to an installation surface on which the information processing apparatus 1 is disposed. The peripheral wall 4b includes a front wall 4ba, a rear wall 4bb and left and right side walls 4bc and 4bd.

The front part 40 includes a touch pad 20 which is a pointing device, a palm rest 21, and a light-emitting diode (LED) 22 which is turned on in association with the operation of respective parts of the information processing apparatus 1.

The central part 41 includes a keyboard mounting part 23 to which a keyboard 23a, which can input character information, etc., is attached.

The back part 42 includes a battery pack 24 which is detachably attached. A power switch 25 for powering on the information processing apparatus 1 is provided on the right side of the battery pack 24. A pair of hinge portions 26a and 26b, which rotatably support the display unit 3, are provided on the left and right sides of the battery pack 24.

An exhaust port (not shown) for exhausting the wind to the outside from the inside of the casing 4, is provided on the left side wall 4bc of the casing 4. In addition, an ODD (Optical Disc Drive) 27, which can read and write data on an optical storage medium such as a DVD, and a card slot 28, in/from which various cards can be inserted/taken out, are disposed on the right side wall 4bd.

The casing 4 is formed of a casing cover including a part of the peripheral wall 4b and the upper wall 4a, and a casing base including a part of the peripheral wall 4b and the lower wall 4c. The casing cover is detachably coupled to the casing base, and an accommodation space is formed between the casing cover and the casing base. This accommodation space accommodates, for instance, an SSD (Solid State Drive) 10 functioning as a nonvolatile semiconductor memory drive. The details of the SSD 10 will be described later.

The display unit 3 includes a display housing 30 having an opening portion 30a, and a display device 31 which is composed of, e.g. an LCD which can display an image on a display screen 31a. The display device 31 is accommodated in the display housing 30, and the display screen 31a is exposed to the outside of the display housing 30 through the opening portion 30a.

The casing 4 accommodates a main circuit board, an expansion module, a fan, etc., which are not shown, in addition to the above-described SSD 10, battery pack 24, ODD 27 and card slot 28.

Figure 2:
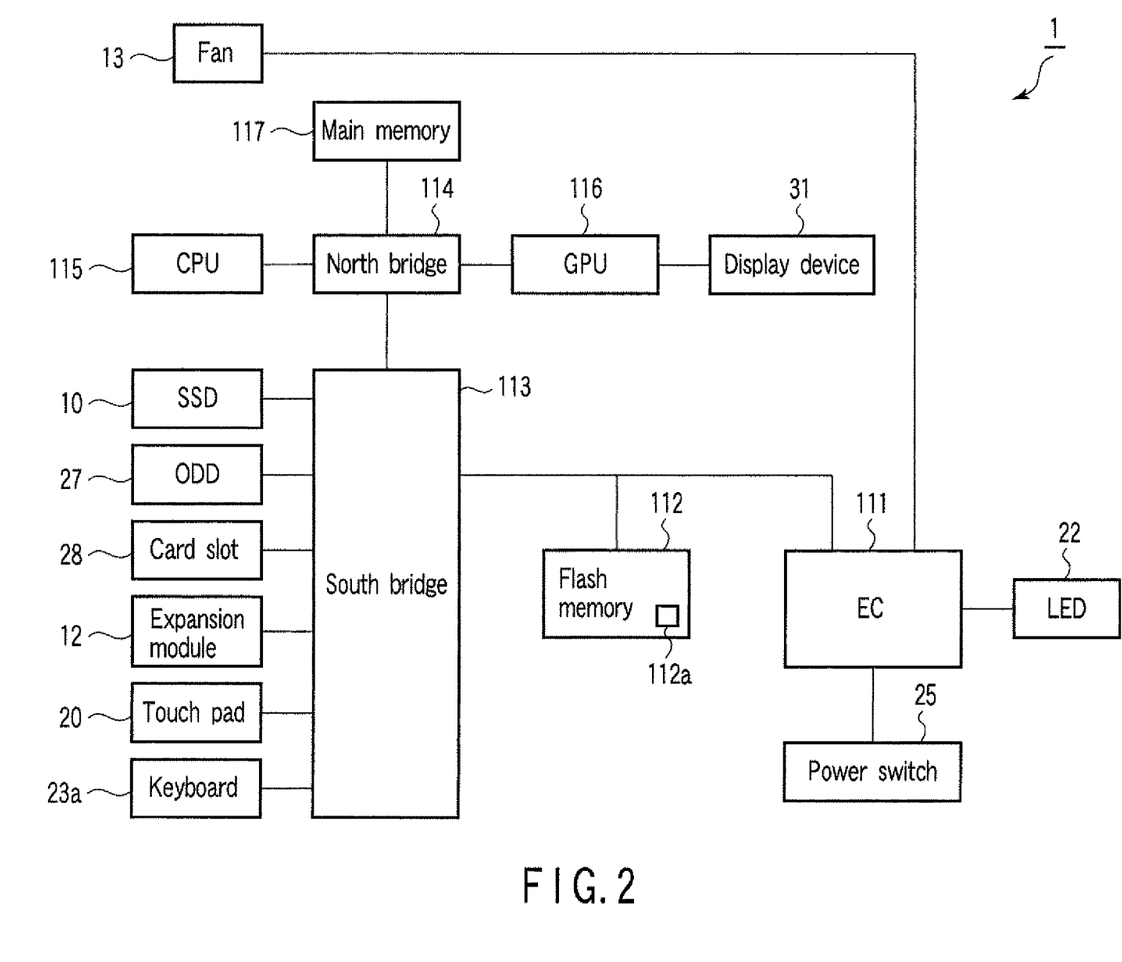
FIG. 2 is a block diagram which schematically shows the structure of the information processing apparatus according to the embodiment.

FIG. 2 is a block diagram which schematically shows the system configuration of the information processing apparatus 1. The information processing apparatus 1, as shown in FIG. 2, includes an EC (Embedded Controller) 111, a flash memory 112 which stores a BIOS (Basic Input Output System) 112a, a south bridge 113, a north bridge 114, a CPU (Central Processing Unit) 115, a GPU (Graphic Processing Unit) 116 and a main memory 117, in addition to the above-described SSD 10, expansion module 12, fan 13, touch pad 20, LED 22, keyboard 23a, power switch 25, ODD 27, card slot 28 and display device 31.

The EC (Embedded Controller) 111 is a built-in system which controls the respective parts. The north bridge 114 is an LSI which controls connection between the CPU 115, GPU 116, main memory 117 and various buses. The CPU 15 is a processor which performs arithmetic processing of various signals, and executes an operating system and various application programs, which are loaded from the SSD 10 into the main memory 117. The GPU 116 is a display controller which executes display control by performing arithmetic processing of a video signal.

The expansion module 12 includes an expansion circuit board, a card socket which is provided on the expansion circuit board, and an expansion module board which is inserted in the card socket. The card socket supports, e.g. the Mini-PCI standard. Examples of the expansion module board include a 3G (3rd Generation) module, a TV tuner, a GPS module, and a Wimax (trademark) module.

The fan 13 is a cooling unit which cools the inside of the casing 4 on the basis of air feeding, and exhausts the air in the casing 4 to the outside as the wind via the exhaust port (not shown).

The EC 111, flash memory 112, south bridge 113, north bridge 114, CPU 115, CPU 116 and main memory 117 are electronic components which are mounted on the main circuit board.

<Structure of SSD>

Figure 3:
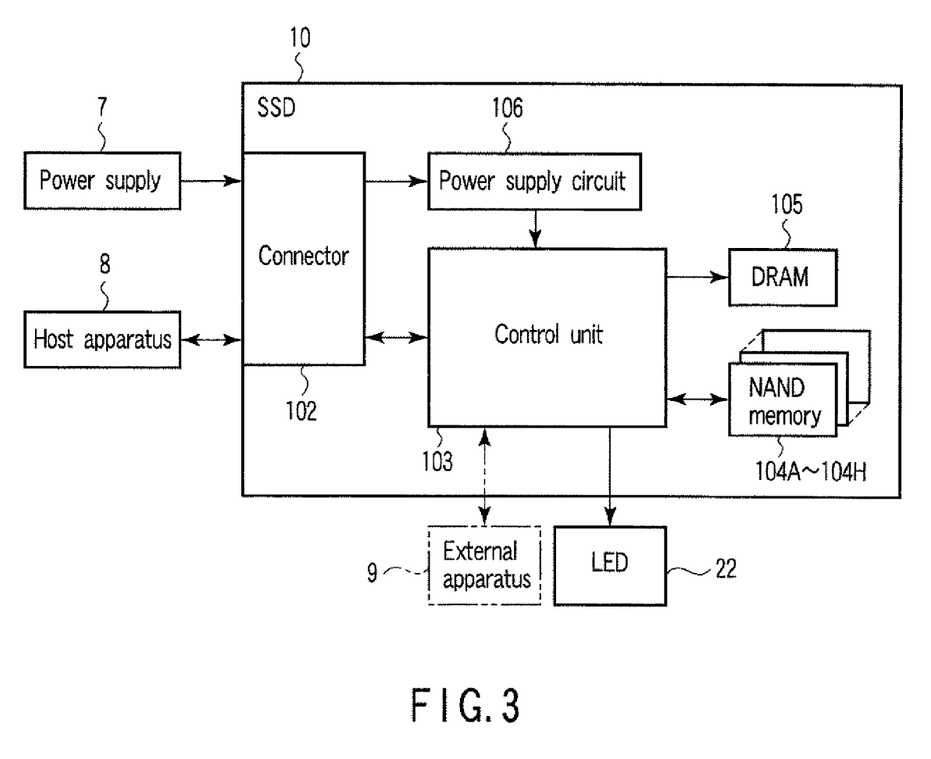
FIG. 3 is a block diagram which schematically shows the structure of an SSD that is provided in the information processing apparatus according to the embodiment.

FIG. 3 is a block diagram which schematically shows the structure of the SDD that is applied to the information processing apparatus according to the embodiment. The SSD 10 is a nonvolatile semiconductor memory drive which, in place of a hard disk, is used as an external storage device of the information processing apparatus 1. The SSD 10, as shown in FIG. 3, substantially comprises a connector 102, a control unit 103, NAND memories (NAND flash EEPROMs) 104A to 104H, a DRAM (memory) 105, and a power supply circuit 106. The SSD 10 is the external storage device which stores data and programs, and the storage content of which is not lost even if no power is supplied. The SSD 10 is a drive which, unlike a hard disk driver does not have a driving mechanism of a magnetic disk, a head, etc., but the SSD 10 can store programs, such as the OS (Operating System), and data which is created by the user or created on the basis of software, in memory areas of a NAND memory, which is a nonvolatile semiconductor memory, for a long time in a readable/writable manner, and can operate as a boot drive of the information processing apparatus 1.

The control unit 103 is connected to the connector 102, eight NAND memories 104A to 104H, DRAM 105 and power supply circuit 106. In addition, the control unit 103 is connected to the host apparatus 8 via the connector 102, and is connected, where necessary, to an external apparatus 9.

A power supply 7 is the battery pack 24 or an AC adapter (not shown). For example, a power of DC 3.3V is supplied to the power supply circuit 106 via the connector 102. In addition, the power supply 7 supplies power to the entirety of the information processing apparatus 1.

In the present embodiment, the host apparatus 8 is the information processing apparatus main body 2 (the main circuit board of the main body 2). The south bridge 113, which is mounted on the main circuit board, is connected to the control unit 103 via the connector 102. Data transmission/reception is executed between the south bridge 113 and control unit 103, for example, on the basis of the serial ATA standard.

The external apparatus 9 is an information processing apparatus which is different from the information processing apparatus 1. The external apparatus 9 is connected to the control unit 103 of the SSD 10 which is removed from the information processing apparatus 1, for example, on the basis of the RS-232C standard, and the external apparatus 9 has a function of reading out data which is stored in the NAND memories 104A to 104H.

The board, on which the SSD 10 is mounted, has the same outside size as an HDD (Hard Disk Drive) of, e.g. 1.8-inch type or 2.5-inch type. In the present embodiment, this board has the same outside size as the 1.8-inch type HDD.

The control unit 103 is a control module configured to control data read/write on the NAND memories 104A to 104H. Specifically, in accordance with a request (read command, write command, etc.) from the information processing apparatus main body 2 that functions as the host apparatus 8, the control unit 103 controls the execution of data read/write on the NAND memories 104A to 104H. Each NAND memory has a plurality of sectors. The control of execution of data read/write in each sector of the NAND memory, 104A to 104H, is executed in units of a predetermined number of sectors, which are called "cluster". The data transfer speed is, for example, 100 MB/Sec at a data read and 40 MB/Sec at a data write.

Each of the NAND memories 104A to 104H is a nonvolatile semiconductor memory having a memory capacity of, e.g. 16 GB. Each of the NAND memories 104A to 104H is composed of, e.g. an MLC (Multi-Level Cell)-NAND memory (multilevel NAND memory) in which 2 bits can be recorded in one memory cell. The MLC-NAND memory has such features that the allowable number of rewrites is smaller than an SLC (Single-Level Cell)-NAND memory, but the memory capacity can be increased more easily than the SLC (Single-Level Cell)-NAND memory.

The DRAM 105 is a buffer which temporarily stores data when data read/write is executed on the NAND memory, 104A to 104H, by the control of the control unit 103. The DRAM 105 functions as a write cache which temporarily stores write data from the information processing apparatus main body 2 that functions as the host apparatus 8.

The connector 102 has a shape based on, e.g. the serial ATA standard. The control unit 103 and power supply circuit 106 may be connected to the host apparatus 8 and power supply 7 via different connectors.

The power supply circuit 106 converts DC 3.3V, which is supplied from the power supply 7, to, e.g. DC 1.8V and 1.2V, and supplies these three kinds of voltages to the respective parts in accordance with the driving voltages of the respective parts of the SSD 10.

<Memory Capacity of SSD>

Figure 4:
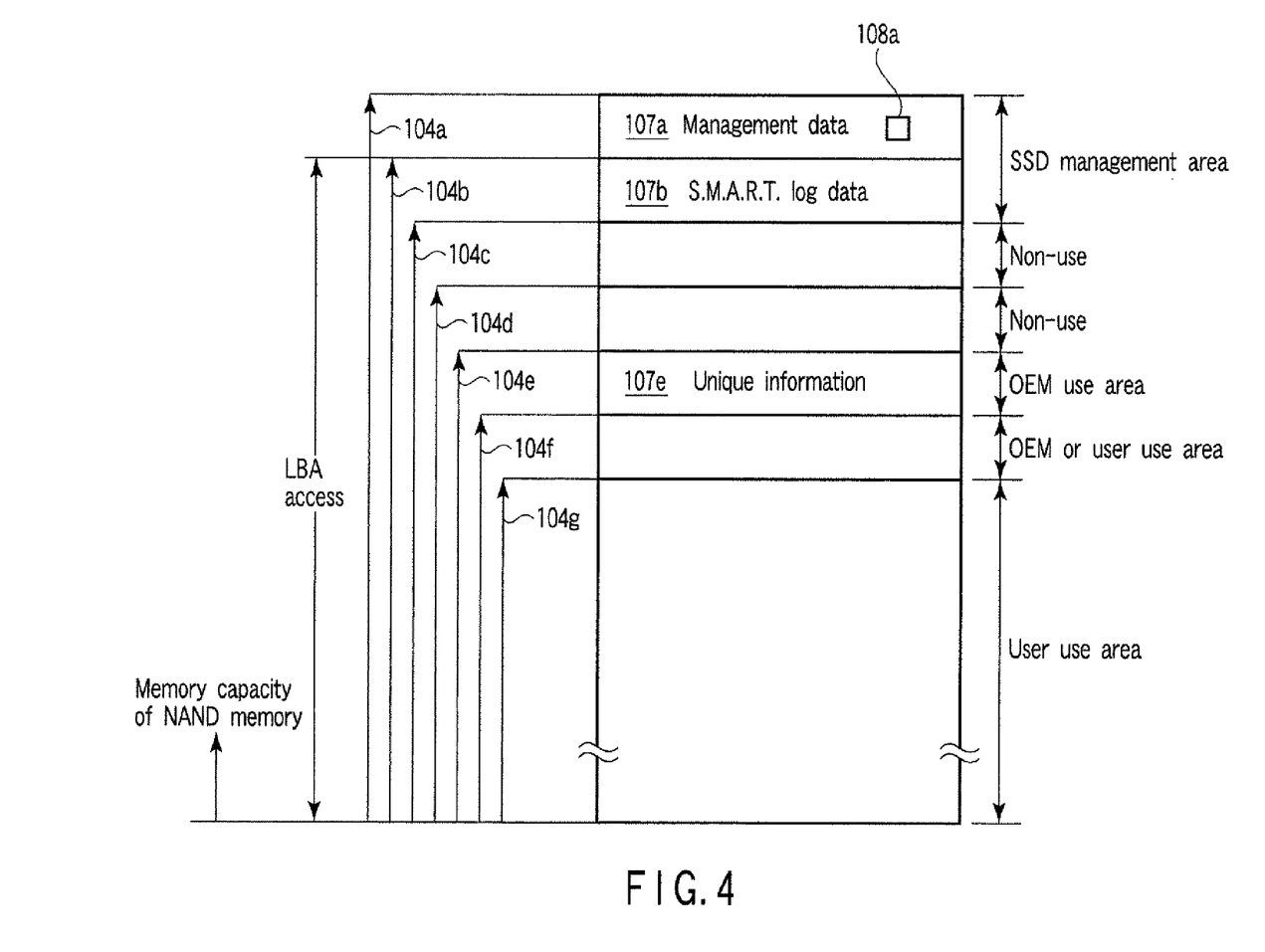
FIG. 4 schematically shows the memory capacities and memory areas of the SSD shown in FIG. 3.

FIG. 4 schematically shows the memory capacities and memory areas of the SSD 10. The control unit 103 of the SSD 10 manages seven kinds of memory capacities 104a to 104g, which are shown in FIG. 4.

The memory capacity 104a is NAND Capacity, and is a maximum memory capacity using the memory areas of all NAND memories 104A to 104H. Specifically, the memory capacity 104a is the sum of the physical memory capacities of the NAND memories 104A to 104H. For example, if the memory capacity of each of the NAND memories 104A to 104H is 16 GB, the memory capacity 104a is 128 GB. The memory capacity 104a, i.e. the NAND Capacity, is given by, e.g. NAND structure information of a manufacture information write command of a UART (Universal Asynchronous Receiver Transmitter).

The memory capacity 104b is Max Logical Capacity, and is a maximum memory capacity that is accessible by a logical block address (LBA).

The memory capacity 104c is a S.M.A.R.T. log area start LBA, and is provided in order to divide the memory capacity 104b and the memory capacity 104d which will be described below. The S.M.A.R.T. log area start LBA indicates a first LBA of the memory area which stores log data.

The memory capacity 104d is Vender Native Capacity, and is a maximum memory capacity which is given as a user use area. The memory capacity 104d is given by, e.g. initial Identify Device data of an ATA specific command. In addition, the memory capacity 104d is determined by the manufacturer (Vender) at the time of design of the SSD 10 on the basis of the IDEMA (The International Disk Drive Equipment and Materials Association) standard, and is expressed by the following equation:

$$LBA = 97{,}696{,}368 + (1{,}953{,}504 \times ((\text{Capacity in GB}) - 50)).$$

The memory capacity 104e is OEM Native Capacity, and is a memory capacity which is determined at the time of manufacture by a request of an OEM (Original Equipment Manufacturer). The memory capacity 104e is given by, e.g. unique information write of an ATA specific command. In addition, the memory capacity 104e is a value which is returned by a Device Configuration Identify command when Device Configuration Overlay Feature Set is supported.

The memory capacity 104f is Native Capacity, and its initial value is equal to the memory capacity 104e. This value can be varied by a Device Configuration Set command when Feature Set is supported. In addition, the memory capacity 104f is a value which is returned by a Read Native Max Address (EXT) command.

The memory capacity 104g is Current Capacity and is a memory capacity during use by the user, and the initial value is equal to the memory capacity 104f. This value can be varied by a SET Max Address command. This value is returned by Word 61:60, and Word 103:100 of an Identify Device command.

The memory areas of the SSD 10 are present between the memory capacities 104a to 104g.

The memory area (management area) between the memory capacities 104a and 104b stores management data 107a for operating the SSD 10, and an address conversion table (logical/physical table) 108a. The address conversion table (logical/physical table) 108a is an address management table for converting the logical block address LBA to a physical address corresponding to a sector which is a memory unit of the NAND memory, 104A to 104H. The address conversion table (logical/physical table) 108a indicates the correspondency between the logical block addresses LBAs and the physical addresses of the NAND memory, 104A to 104H. For example, in the address conversion table (logical/physical table) 108a, the correspondency between the logical block address LBA and the physical address of the NAND memory, 104A to 104H, is managed in units of a cluster. Each cluster is composed of a predetermined number of sectors, as described above. Each of the NAND memories 104A to 104H has a plurality of sectors.

Each of the management data 107a and logical/physical table 108a is data which is recorded in fixed areas in the NAND memories 104A to 104H. The LBA is not allocated to each of the management data 107a and logical/physical table 108a. Thus, each of the management data 107a and logical/physical table 108a cannot be accessed, with the LBA being used as a key. The control unit 103 has a fixed access path for accessing each of the management data 107*a* and logical/ physical table 108*a*, and executes access to each of the management data 107*a* and logical/physical table 108*a* via the fixed access path.

The memory area between the memory capacity 104*b* and memory capacity 104*c* stores S.M.A.R.T. (Self-Monitoring Analysis and Reporting Technology) log data 107*b*. The S.M.A.R.T. log data 107*b* is, for instance, statistical information such as temperature information. The LBAs, which are allocated to the S.M.A.R.T. log data 107*b*, are locally used in order for firmware, which is executed in the control unit 103, to access the S.M.A.R.T. log data 107*b*. The firmware, which is executed in the control unit 103, can access the S.M.A.R.T. log data 107*b* by using the LBA as a key. However, the host apparatus 8 cannot access the S.M.A.R.T. log data 107*b* by an ordinary read or write command.

A non-use memory area having a memory capacity of, e.g. 2 MB is set in the memory area between the memory capacities 104*c* and 104*d*. The reason for this is that the minimum memory unit of the LBA is 8 sectors, which is a memory unit corresponding to 4 KB (a large memory unit is 1 MB), whereas the actual minimum recording unit of data is 1 sector as a matter of course, and thus the S.M.A.R.T. log data 107*b* and the data recorded in the memory area equal to or lower than the memory capacity 104*d* are independently handled by providing an empty memory area with a memory capacity of 1 MB or more between the memory capacities 104*c* and 104*d*.

The memory area between the memory capacities 104*d* and 104*e* is a non-use area, and the memory capacity 104*d* and 104*e* have the same value except for a particular case.

The memory area between the memory capacities 104*e* and 104*f* is a memory area which is used by the OEM. As described above, the unique information 107*e*, which is determined by the request of the OEM, is written in this memory area.

The memory area between the memory capacities 104*f* and 104*g* is a memory area which is used by the OEM or the user. Data write is executed in this memory area by the setting of the OEM or user.

The memory area of the memory capacity 104*g* is a memory area which is used by the user, and data write is executed in this memory area by the setting of the user.

The memory capacities 104*a* to 104*g* satisfy a relationship which is expressed by the following formula:

memory capacity 104*a*>memory capacity
104*b*>memory capacity 104*c*>memory capacity
104*d*≧memory capacity 104*e*≧memory capacity
104*f*≧memory capacity 104*g*.

At the time of shipment from the manufacturer (Vender), the memory capacities 104*d* to 104*g* have the same value.

<Structure of NAND Memory>

Figure 5:
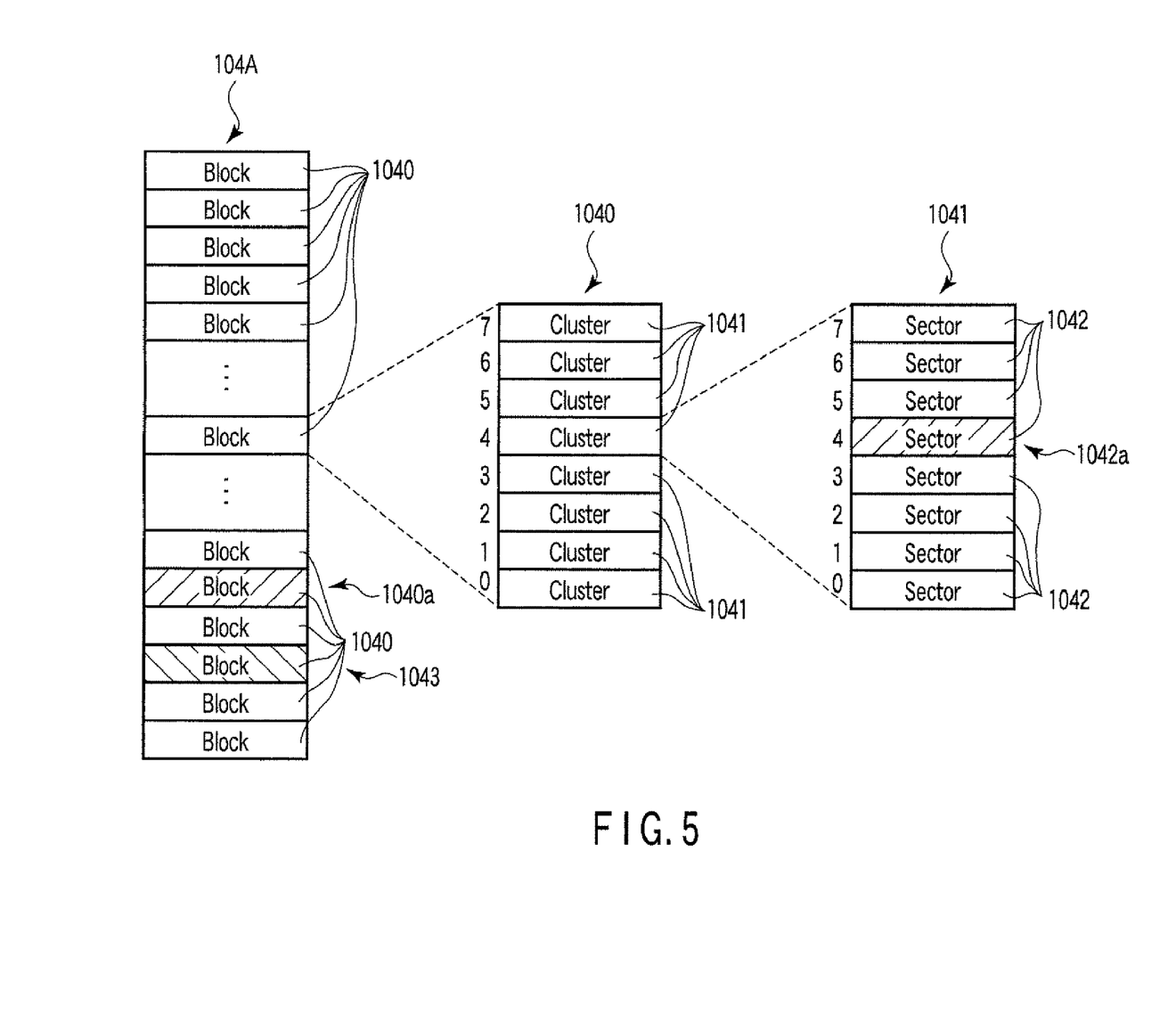
FIG. 5 schematically shows the structure of a NAND memory which is provided in the SSD shown in FIG. 3.
Figure 6:
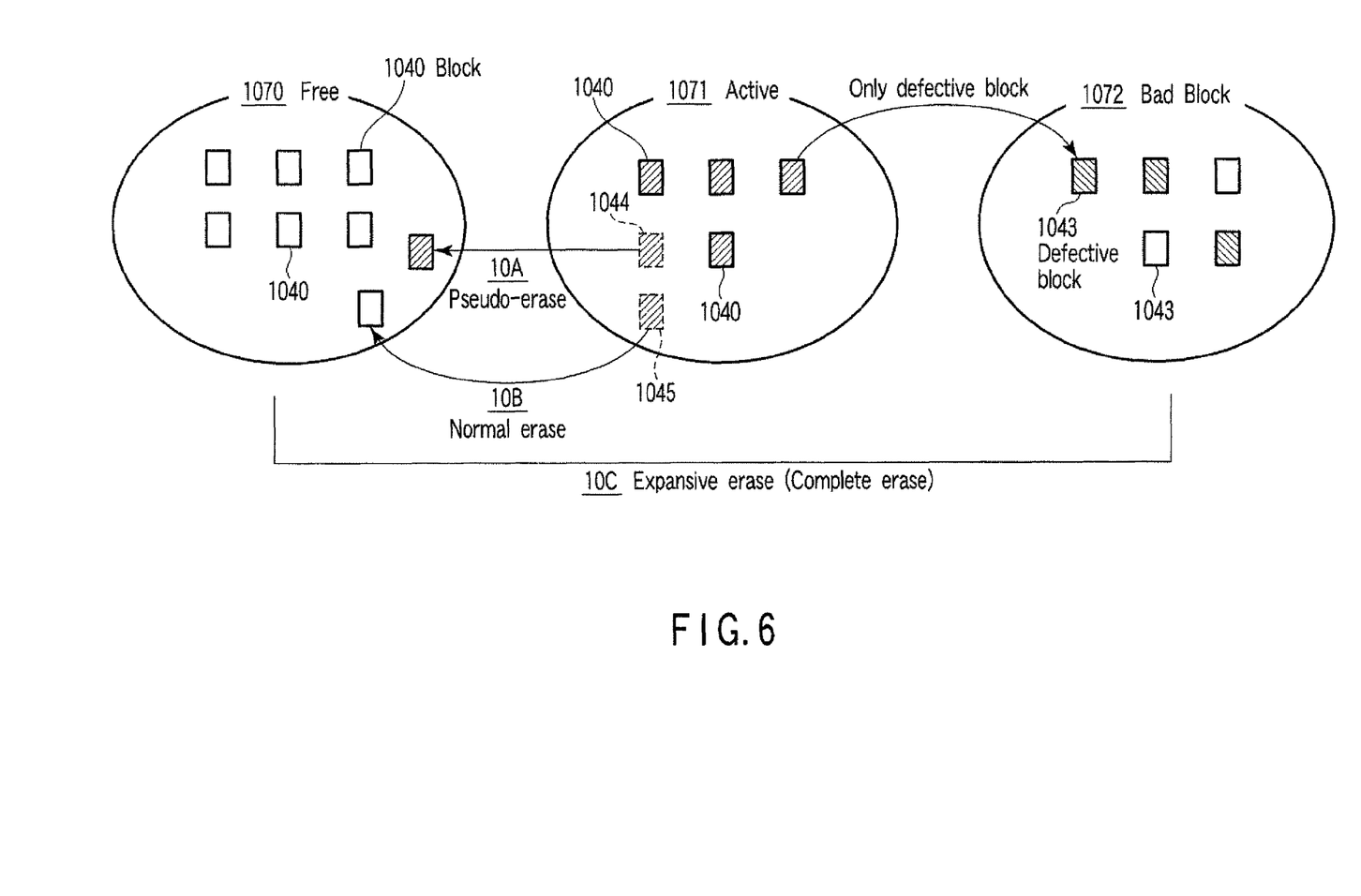
FIG. 6 is a diagram for explaining three kinds of erase methods, which are executable by the SSD shown in FIG. 3.

FIG. 5 schematically shows the structure of the NAND memory which is used in the present embodiment. FIG. 6 is a diagram for explaining three kinds of erase methods, which are used in the embodiment. Since the NAND memories 104A to 104H have the same function and structure, a description is given of the NAND memory 104A. The numbers, which are added to the left sides of clusters (memory units) 1041 and sectors 1042, indicate cluster numbers and sector numbers. In FIG. 6, Free 1070 schematically represents a set (first memory area) of data-writable blocks 1040, Active 1071 schematically represents a set (second memory area) of data-written blocks 1040*a* in which data write is already executed, and Bad Block 1072 schematically represents a set (third memory area) of defective blocks 1043 in which error correction, which will be described later, fails to be executed. The Free 1070, Active 1071 and Bad Block 1072 are stored in the management data 107*a* as parameters which are indicative of the states of the respective blocks 1040. Hatching in FIG. 6 indicates that data is stored.

The NAND memory 104A is composed of a plurality of blocks 1040. Each block 1040 is composed of 1024 clusters 1041. Each cluster 1041 is composed of eight sectors 1042.

When write data, which is less than the data size of one cluster 1041, is written, the control unit 103 executes read from a predetermined number (e.g. 8) of sectors 1042, which constitute the cluster 1041, on the basis of the management data 107*a*, and temporarily stores the data of these sectors in the DRAM 105. The control unit 103 executes, on the DRAM 105, write of write data in the cluster from which data read has been executed, and writes the cluster, in which the write data has been written, into the corresponding cluster 1041 of the NAND memory from the DRAM 105.

In FIG. 5, the defective block 1043, which is indicated by hatching, is a block in which an error occurs at a time of data write or data read. For example, the defective block 1043 indicates a block 1040 in the SSD 10, in which erase or an error has occurred.

<Operation>

The operation of the information processing apparatus 1 in the present embodiment will now be described with reference to the drawings, paying attention to three kinds of erase methods.

To begin with, the outlines of the three kinds of erase methods are explained.

The control unit 103 controls data write and data read on memory areas (NAND memory areas) of the NAND memories 104A to 104H by using the logical/physical table 108*a*. The control unit 103 has a security erase function for erasing all user data which are stored in the NAND memory areas.

The control unit 103 has a pseudo-erase mode, a normal erase mode and an expansive erase mode as erase operation modes for erasing all user data which are stored in the NAND memory areas. The control unit 103 selectively uses the pseudo-erase mode, normal erase mode and expansive erase mode, thereby executing an erase operation on the NAND memory areas.

The pseudo-erase mode is a first erase mode in which the logical/physical table 108*a* is initialized and the NAND memory area including plural blocks 1040 is set in a state in which user data is not written. The process of initializing the logical/physical table 108*a* is a process of setting the logical/ physical table 108*a* in a state in which the physical address corresponding to each logical block address LBA is not written in the logical/physical table 108*a*. In the process of initializing the logical/physical table 108*a*, the control unit 103 executes, for example, a process of deleting, from the logical/ physical table 108*a*, the physical address corresponding to each LBA, or a process of setting, with respect to each LBA stored in the logical/physical table 108*a*, a flag which indicates that the memory area corresponding to the LBA is in a non-written state. In this manner, by initializing the logical/ physical table 108*a*, each block in which user data is written transitions, as a result, to a state in which user data is not written, that is, a non-used free block. Thus, in the pseudo-erase mode, a process of actually erasing each block or a process of writing zero data in each block is not executed. Instead, the logical/physical table 108*a* is initialized. Thereby, user data can be erased more quickly than in the case of executing, e.g. a process of writing zero data in all blocks.

When the control unit 103 receives a command (specific command) for designating the pseudo-erase mode from the host apparatus 8, the control unit 103 initializes the logical/ physical table 108*a* and sets each block in a state in which user data is not written. However, the physical address corresponding to S.M.A.R.T. log data is not deleted from the logical/physical table 108a.

Upon receiving a read command from the host apparatus 8, the control unit 103 determines whether the memory area designated by the LBA included in the read command is in the non-written state, by referring to the logical/physical table 108a. If the memory area designated by the LBA is in the non-written state, the control unit 103 sends to the host apparatus 8 a predetermined value (e.g. zero data) which indicates that the memory area designated by the LBA is erased.

The normal erase mode is a second erase mode in which the logical/physical table 108a is initialized to set the NAND memory area including plural blocks 1040 in a state in which no user data is written, and the blocks, other than defective blocks, included in the NAND memory area, are erased. Specifically, in the normal erase mode, the process of erasing free blocks (block erase process) is executed in addition to the process of initializing the logical/physical table 108a so that the blocks, in which user data is written, become free blocks. In the normal erase mode, defective blocks are excluded from the objects of the erase process. The defective block is a block in which an error occurs at a time of data write or data read.

Upon receiving a command designating the normal erase mode from the host apparatus 8, the control unit 103 initializes the logical/physical table 108a, and sets each block, which stores data (user data) other than management data (including S.M.A.R.T. log data), in a state (free block) in which no user data is written. Then, the control unit 103 executes the block erase process on all free blocks.

The expansive erase mode is an erase mode in which each defective block is erased, in addition to the erase operation of the normal erase mode. In other words, the expansive erase mode is a third erase mode in which the logical/physical table 108a is initialized to set the NAND memory area in the state in which no user data is written, and the blocks including defective blocks, which are included in the NAND memory area, are erased.

Upon receiving a command designating the expansive erase mode from the host apparatus 8, the control unit 103 initializes the logical/physical table 108a, and sets each block, which stores data (user data) other than management data (including S.M.A.R.T. log data), in a state (free block) in which no user data is written. Then, the control unit 103 executes the block erase process on all free blocks and defective blocks.

Next, an example of the operation of the information processing apparatus 1 is described.

If the user presses the power switch 25, the EC 111 detects the pressing of the power switch 25 and starts supplying power from the power supply 7 to the respective parts of the information processing apparatus 1. In addition, the EC 111 boots up the information processing apparatus 1 on the basis of the BIOS 112a.

If the boot of the information processing apparatus 1 is completed, the user performs an operation on the information processing apparatus 1 by using the touch pad 20 and keyboard 23a, while viewing the display screen 31a of the display device 31.

Upon accepting the operation by the user, the information processing apparatus 1 performs a predetermined operation according to the operation by the user. For example, in the case where the CPU 15 of the information processing apparatus 1 has accepted the operation for displaying the data, which is stored in the SSD 10, on the display device 31, the CPU 115 sends to the SSD 10 a read command for instructing data read-out from the SSD 10. Then, the control unit 103 of the SSD 10 executes data read from the NAND memories 104A to 104H, and sends the read data to the GPU 116 via the south bridge 113 and north bridge 114. The GPU 116 displays the data as an image on the display device 31.

<Pseudo-Erase>

Figure 7:
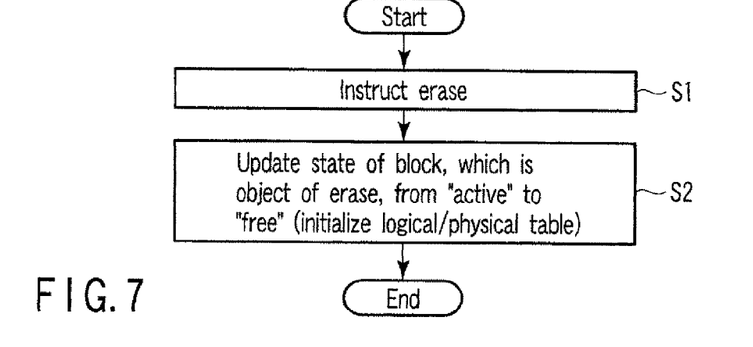
FIG. 7 is a flow chart illustrating an example of the procedure of pseudo-erase, which is executed by the SSD shown in FIG. 3.

FIG. 7 is a flow chart illustrating an example of the pseudo-erase mode as the first erase mode which is used in the present embodiment. To begin with, referring to the flow chart of FIG. 7, an example of the method of pseudo-erase 10A is described.

The user executes, through the touch pad 20 and keyboard 23a, an operation on an image which is displayed on the display screen 31a of the display device 31 by, e.g. the operation of an application, and instructs erase of, e.g. a document stored in the SSD 10 by using the touch pad 20 and keyboard 23a (step S1). The CPU 115 instructs erase of data (predetermined information) of the document, the erase of which has been instructed to the SSD 10.

Upon receiving the instruction from the CPU 115 via the connector the connector 102, the control unit 103 of the SSD 10 refers to the management data 107a of each NAND memory, 104A to 104H, and searches for the NAND memory in which the data of the document is stored. Based on the management data 107a, the control unit 103 determines, for example, whether the data of the document that is the object of erase is stored in a sector included in a block 1044 (e.g. sector 1042a included in the block 1040 shown in FIG. 5) which is in the state of Active 1071 shown in FIG. 6. If the data of the document that is the object of erase is stored in the sector included in the block 1044 which is in the state of Active 1071, the control unit 103 updates the state of the management data 107a, which corresponds to this block 1044, from Active 1071 to Free 1070 (step S2). It is assumed that the block 1044 stores only the data of the document that is the object of erase.

The above-described erase method is called the pseudo-erase 10A, and the state of the management data 107a of the data of the document, which is the object of erase, is simply updated. Since the data of the document itself is not erased, this erase method can quickly be executed. In this erase method, for example, in the case of discarding the SSD 10 which stores data with a high security level, since the data itself remains in the SSD 10, it is possible that the data may be read out.

In the above-described case, the pseudo-erase 10A has been applied to the erase of a specified one block. However, the pseudo-erase 10A is applicable to all blocks in which data (user data) other than the management data is written. Specifically, when the control unit 103 receives a command (specific command) designating the pseudo-erase mode from the CPU 115, the control unit 103 initializes the logical/physical table 108a and sets each block (each block in the active state), in which user data is written, in the state (free block) in which user data is not written. Thereby, almost all blocks, other than blocks storing S.M.A.R.T. log data, become free blocks.

<Normal Erase>

Figure 8:
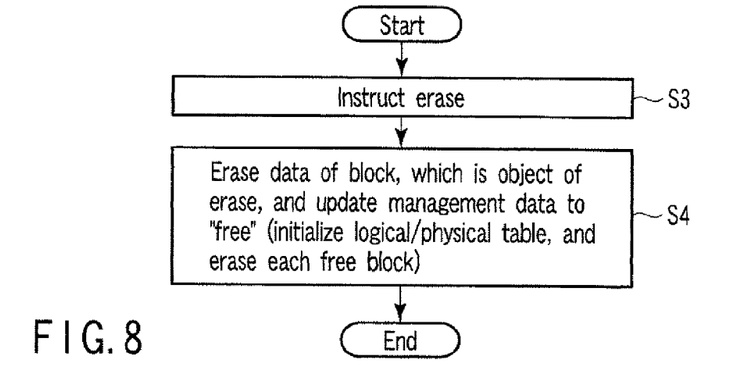
FIG. 8 is a flow chart illustrating an example of the procedure of normal erase, which is executed by the SSD shown in FIG. 3.

FIG. 8 is a flow chart illustrating the normal erase as the second erase according to the present embodiment. Referring to the flow chart of FIG. 8, the method of normal erase 10B is described. In the description below, the operation common to that of the pseudo-erase 10A is omitted.

Like the above-described pseudo-erase 10A, when the erase of a document is instructed by the user (step S3), for example, if data of the document that is the object of erase is stored in a sector (written sector) 1042a of a block 1045 that is in the state of Active 1071, as shown in FIG. 6, the control unit 103, on the basis of the management data 17a, erases the data stored in the block 1045 by executing block erase of the block 1045, and updates the state of the management data 107*a* corresponding to the block 1045 from Active 1071 to Free 1070 (step S4). It is assumed that the block 1045 stores only the data of the document that is the object of erase.

The above-described erase method is called the normal erase 10B, and erase of the data of the document that is the object of erase is executed, and the management data 107*a* is updated. In this normal erase 10B, for example, in the case of discarding the SSD 10 which stores data with a high security level, more exact erase than the pseudo-erase 10A can be executed. However, since the data stored in the defective block 1043, which is in the state of Bad Block 1072, is not erased, it cannot be said that complete eraser which disables read-out of data with a high security level, is executed.

In the above-described case, the normal erase 10B has been applied to erase of one specified block. However, the normal erase 10B is applicable to all blocks in which data (user data) other than the management data is written. Specifically, when the control unit 103 receives a command designating the normal erase mode from the CPU 115, the control unit 103 initializes the logical/physical table 108*a* and sets each block (each block in the active state), in which user data is written, in the state (free block) in which user data is not written. Thereafter, the control unit 103 erases, by block erase, the blocks, other than defective blocks, which are included in the NAND memory area, that is, all free blocks.

Next, a description is given of the expansive erase 10C, which is a complete erase method which disables read-out of data with a high security level.

<Expansive Erase>

Figure 9:
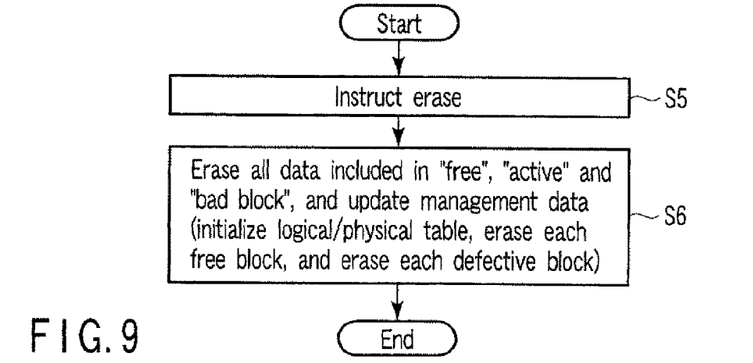
FIG. 9 is a flow chart illustrating an example of the procedure of expansive erase, which is executed by the SSD shown in FIG. 3.

FIG. 9 is a flow chart illustrating the expansive erase as the third erase.

In the expansive erase 10C, erase of all data (user data) of the SSD 10 is executed. For example, assume the case in which an optical disc, which stores the operating system that is necessary for booting the information processing apparatus 1, is inserted in the ODD 27, the information processing apparatus 1 is booted from the optical disc, and an application which can execute the expansive erase 10C of the SSD 10 is started.

The user, for example, instructs the expansive erase 10C by using the touch pad 20 and keyboard 23*a*, while viewing items of erase which are displayed on the display screen 31*a* (step S5), and the CPU 115 instructs the SSD 10 to execute the expansive erase 10C.

When the expansive erase 10C of the SSD 10 is instructed by the user, the control unit 103 executes erase of all data stored in the Free 1070, Active 1071 and Bad Block 1072, and executes update of the management data 107*a* (step S6). The update of the management data 107*a* means update of the block 1043 and block 1040 from the states of Active 1071 and Bad Block 1072 to the state of Free 1070.

The above-described erase method is called the expansive erase 10C. Since the expansive erase 10C covers the erase of the Bad Block 1072, more exact data erase can be executed than the other erase methods. The expansive erase 10C is suited, for example, to the case of discarding the SSD 10 which stores data with a high security level. The expansive erase 10C may be executed not by the above-described start of the application stored in the optical disc, but by, e.g. a command operation.

In step S6, for example, the following process is executed. Specifically, upon receiving a command designating the expansive erase mode from the host apparatus 8, the control unit 103 initializes the logical/physical table 108*a*, and sets each block, which stores data (user data) other than management data (including S.M.A.R.T. log data), in a state (free block) in which no user data is written. The control unit 103 executes the block erase process on all free blocks and defective blocks.

According to the above-described embodiment, the pseudo-erase 10A can quickly set each block in the state in which no data is written. In the normal erase 10B, since the data in each block is actually erased, the reliability of data erase is higher than the pseudo-erase 10A. In the expansive erase 10C, the Bad Block 1072, which is not erased in the normal erase 10B, is also erased, and it is possible, therefore, to prevent leak of information from the information processing apparatus 1 or SSD 10, which stores data with a high security level, and to safely discard the information processing apparatus 1 or SSD 10.

Therefore, in the present embodiment, the pseudo-erase mode, normal erase mode and expansive erase mode can selectively be used according to the purpose of use.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
an information processing apparatus main body; and
a nonvolatile semiconductor memory drive which is accommodated in the information processing apparatus main body, the nonvolatile semiconductor memory drive including a nonvolatile semiconductor memory having a memory area including a plurality of blocks, and a control module, the control module having a first erase mode in which an address management table, which is indicative of a correspondency between logical block addresses and physical addresses of the nonvolatile semiconductor memory, is initialized to indicate that the memory area has no user data, a second erase mode in which the address management table is initialized to indicate that the memory area has no user data, and the blocks, other than a defective block, which are included in the memory area, are erased, and a third erase mode in which the address management table is initialized to indicate that the memory area has no user data, and the blocks, including the defective block, which are included in the memory area, are erased, and the control module selectively using the first erase mode, the second erase mode and third erase mode, thereby executing an erase operation on the memory area, wherein the control module selects the first erase mode when a command for designating the first erase mode is received from the information processing apparatus main body, selects the second erase mode when a command for designating the second erase mode is received from the information processing apparatus main body, and selects the third erase mode when a command for designating the third erase mode is received from the information processing apparatus main body.

2. The information processing apparatus of claim 1, wherein the defective block is a block in which an error occurs at a time of data write or data read.

3. The information processing apparatus of claim 1, wherein a process of initializing the address management table includes a process of setting the address management table in a state in which the physical address corresponding to each of the logical block addresses is not written in the address management table.

4. A nonvolatile semiconductor memory drive which is used as an external storage device of an information processing apparatus, comprising:
   a nonvolatile semiconductor memory having a memory area including a plurality of blocks; and
   a control module having a first erase mode in which an address management table, which is indicative of a correspondency between logical block addresses and physical addresses of the nonvolatile semiconductor memory, is initialized to indicate that the memory area has no user data, a second erase mode in which the address management table is initialized to indicate that the memory area has no user data, and the blocks, other than a defective block, which are included in the memory area, are erased, and a third erase mode in which the address management table is initialized to indicate that the memory area has no user data, and the blocks, including the defective block, which are included in the memory area, are erased, the control module selectively using the first erase mode, the second erase mode and third erase mode, thereby executing an erase operation on the memory area, wherein the control module selects the first erase mode when a command for designating the first erase mode is received from the information processing apparatus, selects the second erase mode when a command for designating the second erase mode is received from the information processing apparatus, and selects the third erase mode when a command for designating the third erase mode is received from the information processing apparatus.

5. The nonvolatile semiconductor memory drive of claim 4, wherein the defective block is a block in which an error occurs at a time of data write or data read.

6. The nonvolatile semiconductor memory drive of claim 4, wherein a process of initializing the address management table includes a process of setting the address management table in a state in which the physical address corresponding to each of the logical block addresses is not written in the address management table.

7. A nonvolatile semiconductor memory drive which is used as an external storage device of an information processing apparatus, comprising:
   a nonvolatile semiconductor memory that comprises a memory area including a plurality of blocks, the nonvolatile semiconductor memory storing an address management table; and
   a control unit that controls data write and data read on the plurality of blocks within the memory area of the nonvolatile semiconductor memory, the control unit is adapted to select one erase mode from a plurality of erase modes upon receipt of a command corresponding to the one of the plurality of erase modes, the plurality of erase modes comprise (i) a first erase mode in which the address management table, including logical block addresses and their corresponding physical addresses of the nonvolatile semiconductor memory, is initialized to indicate that the memory area has no user data, (ii) a second erase mode in which the address management table is initialized to indicate that the memory area has no user data and the plurality of blocks, other than a defective block in the memory area, are erased, and (iii) a third erase mode in which the address management table is initialized to indicate that the memory area has no user data and the plurality of blocks in the memory area, including the defective block, are erased.

8. The nonvolatile semiconductor memory drive of claim 7, wherein the control unit to receive the command from a circuit board implemented within the information processing apparatus.

* * * * *